United States Patent [19]

Pammenter et al.

[11] 4,192,852
[45] Mar. 11, 1980

[54] PROCESS FOR PRECIPITATING IRON AS JAROSITE WITH A LOW NON-FERROUS METAL CONTENT

[75] Inventors: Robert V. Pammenter; Curzon J. Haigh, both of Lindisfarne, Australia

[73] Assignee: Electrolytic Zinc Co. of Australasia Limited, Melbourne, Australia

[21] Appl. No.: 903,524

[22] Filed: May 8, 1978

[30] Foreign Application Priority Data

May 9, 1977 [AU] Australia ............................... PD0030

[51] Int. Cl.² ....................... C01G 3/00; C01G 49/14
[52] U.S. Cl. ...................................... 423/42; 423/106; 423/109; 423/140; 423/145; 423/146
[58] Field of Search ............... 423/106, 109, 140, 145, 423/146, 42

[56] References Cited

U.S. PATENT DOCUMENTS

| 3,434,798 | 3/1969 | Menendez et al. | 423/109 |
| 3,691,038 | 9/1972 | Von Roepenack et al. | 423/109 |
| 3,985,857 | 10/1976 | Menendez et al. | 423/106 |

OTHER PUBLICATIONS

Gordon et al., "Improved Leaching Technologies in the Electrolytic Zinc Industry", *Metallurgical Transactions*, B Mar. 1975, pp. 43–53.

*Primary Examiner*—Herbert T. Carter
*Attorney, Agent, or Firm*—Larson, Taylor and Hinds

[57] ABSTRACT

A process for precipitating iron as a jarosite from a sulphate solution containing ferric iron, free acid and valuable non-ferrous metals, characterized by cooling the solution; partially neutralizing the free acidity, and then clarifying the solution; heating the clarified solution to a temperature not exceeding the boiling point at atmospheric pressure, in the presence of at least one ion selected from the group consisting of sodium, potassium and ammonium ions, and in the presence of recycled jarosite, and without the addition of any further neutralizing agent, so that substantially all of the ferric iron is precipitated as a jarosite; and separating precipitated jarosite from the solution; thereby producing a jarosite contaminated with only minor amounts of non-ferrous metals, and a solution which may be further processed by established procedures for the recovery of dissolved valuable non-ferrous metals therefrom. The invention also contemplates a dilution step, and recycle of jarosite.

15 Claims, 6 Drawing Figures

FIG. 1 - NEUTRAL LEACH FOLLOWED BY HOT ACID LEACH AND JAROSITE PRECIPITATION ACCORDING TO THE PRIOR ART.

FIG. 2. PRE-NEUTRALIZATION, HOT ACID LEACHING AND JAROSITE PRECIPITATION ACCORDING TO THE PRIOR ART.

PROCESS FOR PRECIPITATING IRON AS JAROSITE WITH A LOW NON-FERROUS METAL CONTENT

This invention relates to the separation of iron from sulphate solutions as a jarosite contaminated with only minor amounts of non-ferrous metals. Jarosite compounds approximate to the general formula $AFe_3(SO_4)_2(OH)_6$ where A is chosen from the group consisting of $H_3O$, Na, K and $NH_4$. Mixed jarosites and solid solutions may also be formed containing more than one component of the aforesaid group.

In hydrometallurgical processes, in which jarosite compounds are formed, such compounds usually form part of a product which may also contain other materials, which other materials may include for example zinc ferrite, gypsum, zinc sulphide. Such products are commonly referred to as "jarosite", and in this specification the word "jarosite" is used to mean pure compounds, solid solutions and mixtures of these with other materials as the context may require.

The precipitation of iron as a jarosite can be represented by the following typical equation $$3Fe_2(SO_4)_3 + (NH_4)_2SO_4 + 12H_2O \rightarrow 2NH_4Fe_3(SO_4)_2(OH)_6 + 6H_2SO_4 \ldots \quad 1$$

In the hydrometallurgical recovery of valuable metals such as zinc, nickel, cobalt and copper from ores, concentrates, residues, and other raw materials, it is usually necessary to separate dissolved iron from sulphate solutions of the metals, because dissolved iron interferes with the subsequent metal recovery steps. Although the invention has particular application to the hydrometallurgical recovery of zinc from zinc sulphide concentrates or oxidised zinc ores containing soluble iron by the electrolytic zinc process, it is not limited to zinc bearing solutions, but also applies to the separation of iron from sulphate solutions containing other valuable metals.

During recent years a number of processes for separating dissolved iron from sulphate solutions by precipitation have been proposed. Australian Pat. No. 401,724 describes a process for treating zinc plant residues containing zinc ferrite which includes hot acid leaching of the residue in sulphuric acid solution to dissolve zinc, iron, and other valuable metals followed by heating of the clarified leach solution to a temperature above 60° C. in the presence of sodium, potassium or ammonium ions so that the ferric iron is precipitated as an insoluble basic iron sulphate of the jarosite type. A neutralising agent is required for jarosite precipitation at temperatures below the boiling point at atmospheric pressure.

A high free acidity is required in the hot acid leaching step in order to dissolve the zinc ferrite, but the excess free acidity adversely affects the jarosite precipitation reaction (see equation 1 above). The free acidity in the hot acid leaching step may be lowered to some extent, but to maintain extraction of zinc from the zinc ferrite the residence time in the said step must be increased to compensate for the lowered free acidity. However, at low free acidities, the dissolved ferric iron becomes unstable and tends to hydrolyse prematurely and precipitate as jarosite. This jarosite then contaminates and downgrades the undissolved solids removed from the hot acid leaching step. These undissolved solids are enriched with respect to lead, silver and gold, and in many electrolytic zinc plants are separated for subsequent recovery of the contained metal values. Any downgrading of these solids with jarosite from premature hydrolysis is therefore undesirable. For this reason, free acidities in the hot acid leaching step are usually held in excess of 40 g/l, and this level of acidity retards the precipitation of jarosite at temperatures below the boiling point of the solution.

It has been found however that in order to precipitate sufficient iron from the leach solution so that subsequent processing of the solution by established procedures is economically possible, it is necessary to heat the leach solution to a temperature well above the boiling point. Such an operation requires the use of autoclaves which are relatively expensive to install and operate, and consequently this procedure has not yet been used commercially. Nevertheless, the jarosite precipitate produced by this process is relatively pure and is particularly suitable for conversion into pigment grade ferric oxide or as feed to an iron blast furnace.

U.S. Pat. No. 3,434,947 describes a process in which the iron is precipitated as a jarosite at a temperature up to the boiling point at atmospheric pressure by controlling the pH of the solution at less than 1.5 by the addition of a neutralizing agent.

It will be appreciated by those skilled in the art that the neutralizing agent used in operation of this process is required for two duties, viz.:

1. to neutralize excess free acid in the solution entering the jarosite precipitation stage, and
2. to neutralize acid liberated according to equation (1) during precipitation of jarosite.

Figure 1:
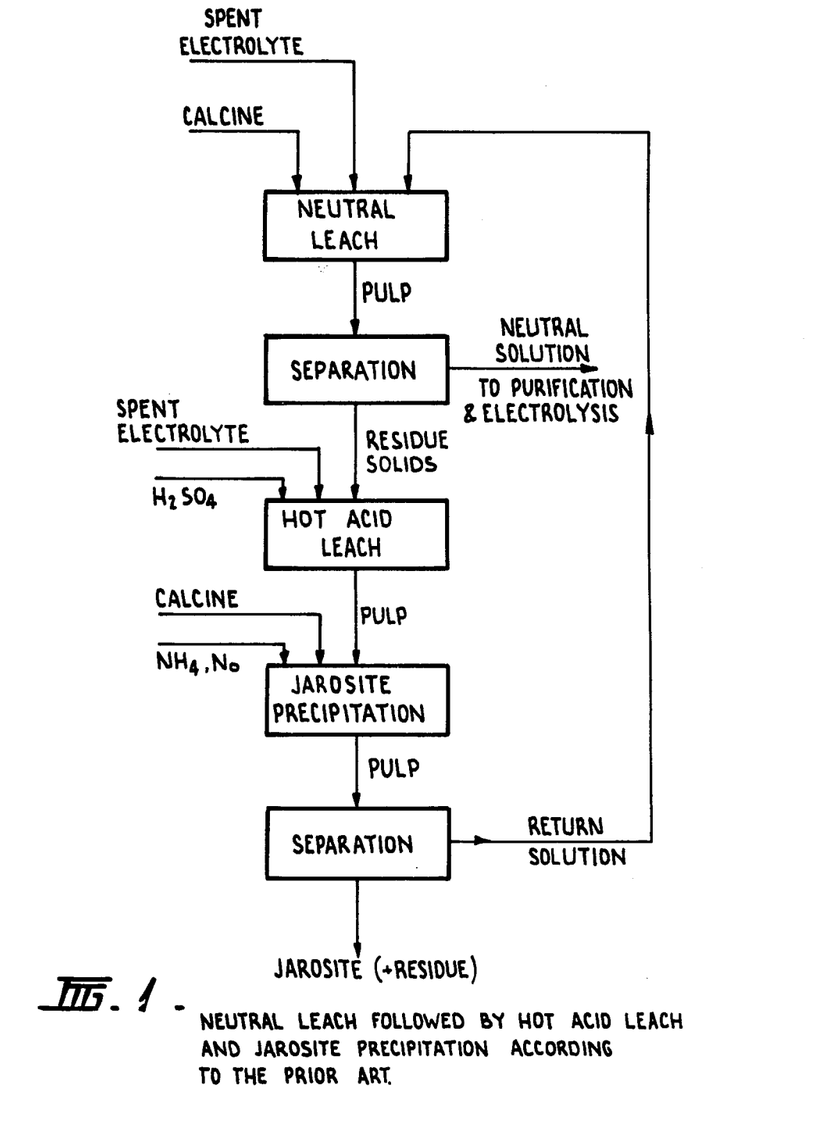
FIG. 1 is a simple flow sheet for a prior art process in which ferrites in residues from a neutral leaching step are dissolved in a hot leaching step and the resultant dissolved iron is precipitated as a jarosite.

The most economical, readily obtainable, neutralizing agent available to electrolytic zinc producers is zinc oxide calcine, or sinter produced by roasting zinc sulphide concentrate. In the accompanying drawings FIG. 1 illustrates a simple flowsheet for this process, in which ferrites in residues from a neutral leaching step are dissolved in a hot acid leaching step and the resultant dissolved iron is precipitated as a jarosite.

This process has the advantage of not requiring the use of an expensive autoclave, but produces a jarosite contaminated with non-ferrous metals contained in the residue from the neutralizing agent added to control the pH in the jarosite precipitation step. The amount of contamination will depend on the quantity and quality of the calcine or sinter used as the neutralizing agent.

Jarosite produced in the electrolytic zinc process from "normal" concentrates typically contains
Zn—2 to 6%

Fe—about 25 to 30%
Cu—0.1 to 0.3%
Cd—0.1 to 0.2%
Pb—0.2 to 2%
Ag—10 to 150 ppm
Ca—0.1 to 0.8%
Mg—0.1 to 0.7%
$SiO_2$—1 to 5%

The jarosite waste in fact often contains only 58 to 75% pure jarosite, the remainder being zinc ferrite and other contaminants.

The level of contamination of the jarosite precipitate can be reduced by leaching it with an acid as described in Norwegian Pat. No. 123,248. However, the final product still contains significant levels of zinc and lead, which make the jarosite unacceptable as a raw material for iron manufacture or for conversion into pigment grade ferric oxide.

The contamination of jarosite by toxic non-ferrous metals poses problems with the disposal of jarosite as a waste material. When it is stored on land, great care must be taken to avoid contamination of the surrounding areas. Various processes have been developed to make the contaminant non-ferrous metals inert, such as by mixing jarosite with lime or cement, so that jarosite can be disposed of without hazards. Such processes are expensive and have not been entirely successful.

"Clean" neutralizing agents which do not contain significant quantities of non-ferrous metals, such as finely ground limestone, are not normally economically viable alternatives to calcine or zinc ferrite bearing residues because of their cost, the large quantities required per unit weight of iron precipitated, and the substantial addition of gypsum to the jarosite waste which adds a major burden to the disposal operations, or makes the jarosite unsuitable for pigment or iron manufacture.

Figure 2:
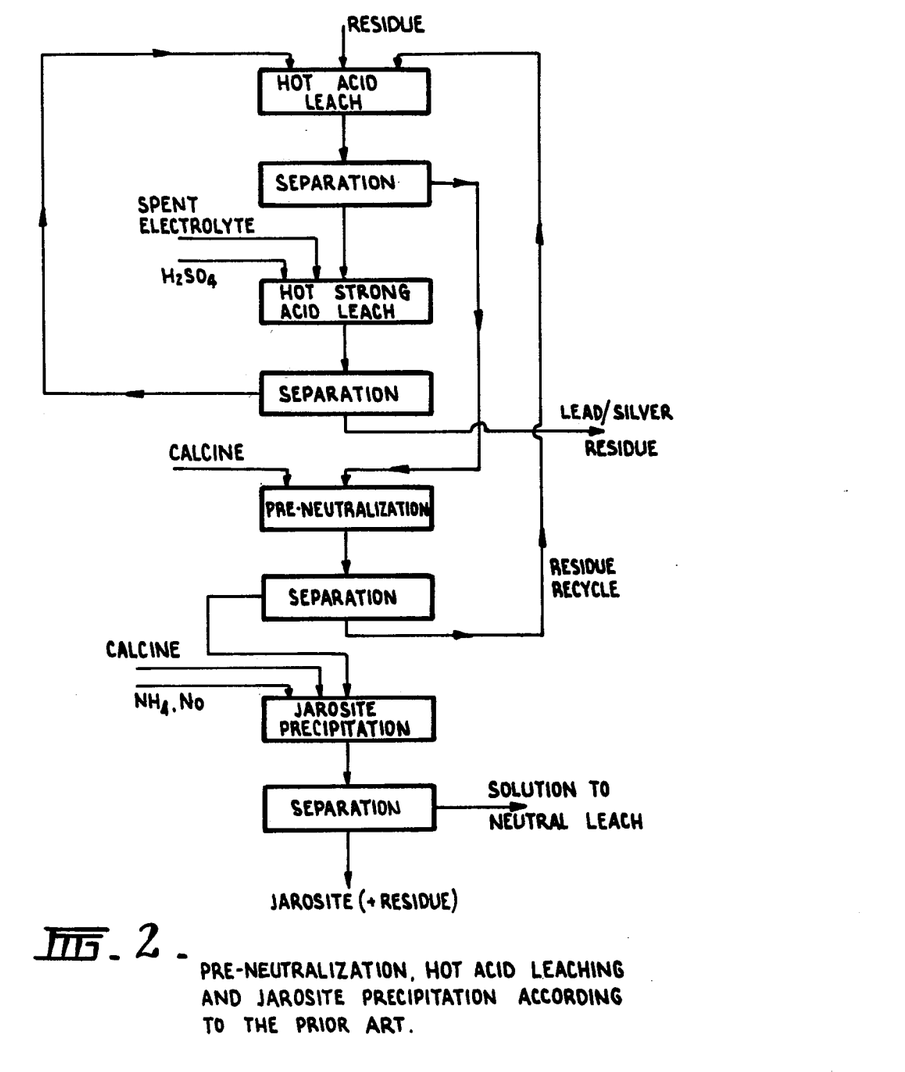
FIG. 2 is a typical flow sheet for a prior art process including pre-neutralization, hot acid leaching and jarosite precipitation.

It is known from the prior art to add an additional step, termed a preneutralization step, between the hot acid leaching step, and the jarosite precipitation step, in which some of the free acidity of the solution is neutralized by the addition of a suitable neutralizing agent, such as calcine. A typical flowsheet is shown in FIG. 2 of the accompanying drawings. The level to which the free acidity can be lowered in the preneutralization step is typically limited to about 30 grams per liter by the fact that premature hydrolysis of dissolved ferric iron occurs to an increasing extent as the free acidity is lowered. Since the undissolved solids from the preneutralization step are generally recycled to the hot acid leach step, any products from premature hydrolysis in the preneutralization step must be dissolved in the hot acid leach step if the recovered undissolved solids from the latter step are not to be downgraded. This is often difficult in practice.

We have found that by cooling the solution from the hot acid leaching step it is possible to stabilize the dissolved iron and prevent substantial premature hydrolysis, even when the free acid concentration is reduced to a low level during a preneutralization step.

We have also found that by raising the temperature of solutions from the preneutralization step and, in the presence of at least one ion drawn from a group containing sodium, potassium and ammonium, it is possible to precipitate a substantial proportion of the dissolved ferric iron as a jarosite without the need to add any neutralizing agent other than that which may be added as a source of the aforesaid ions.

For batch operation of the jarosite precipitation step recycle of jarosite seed crystals is advantageous as it eliminates the induction period during which the rate of jarosite precipitation is low. In continuous operation, we have found recycle is also advantageous in that the residual ferric iron concentration in the solution leaving the last jarosite precipitation vessel is decreased by the recycle of the jarosite precipitate in one or more stages at a rate of between 50 and 400 grams of jarosite per liter of feed solution.

According to one preferred form of the present invention there is provided a process for precipitating iron as a jarosite from a sulphate solution containing ferric iron, free acid and valuable non-ferrous metals, characterised by the steps of:

(1) cooling the solution;

(2) partially neutralizing the free acidity, and then clarifying the solution;

(3) heating the clarified solution to a temperature not exceeding the boiling point at atmospheric pressure, in the presence of at least one ion selected from the group consisting of sodium, potassium and ammonium ions, and in the presence of recycled jarosite, and without the addition of any further neutralizing agent, so that substantially all of the ferric iron is precipitated as a jarosite; and (4) separating precipitated jarosite from the solution; thereby producing a jarosite contaminated with only minor amounts of non-ferrous metals, and a solution which may be further processed by established procedures for the recovery of dissolved valuable non-ferrous metals therefrom.

According to another preferred form of the present invention there is provided a process for precipitating ferric iron from a sulphate solution in which the sulphate solution originates from a hot acid leaching step in the electrolytic zinc process and which after separation of undissolved solids contains 5 to 50, preferably 15 to 25, grams of ferric iron per liter, 30 to 100, preferably 35 to 70, grams of free sulphuric acid per liter, and at least 20 grams of zinc per liter as well as non-ferrous metal impurities including cadmium, copper, and nickel, characterised by treating the said solution in a four step process comprising:

(1) cooling the said solution to a temperature in the range 30° to 80° C.;

(2) treating the solution from step (1) in one or more stages with a neutralising agent or agents to lower the free acidity of the solution to within the range 0.1 to 25, preferably 2 to 15, grams per liter, and separating any residues or undissolved neutralizing agents from the solution;

(3) heating the clarified solution from step (2) in one or more stages to a temperature in the range 80° C. to the boiling point of the solution at atmospheric pressure, preferably above 95° C., in the presence of at least one ion chosen from the group consisting of sodium, potassium and ammonium ions, the mole ratio of the said ions to dissolved ferric iron lying in the range 0.1 to 10, and in the presence of recycled jarosite, preferably in the range 50 to 400 grams of jarosite per liter of solution, and without addition of any further neutralizing agent other than any which may be added as a source of the aforesaid ions, so that substantially all of the ferric iron is precipitated as a jarosite; and (4) separating the jarosite precipitated in step (3) from the solution by thickening, filtration and washing; thereby producing a jarosite contaminated with only minor amounts of non-ferrous metals, and a solution which may be further processed by established procedures for the recovery of dissolved valuable non-ferrous metals therefrom.

Step (1) of this preferred form of the present invention can be conducted in one or more stages by various procedures. Thus, the solution can be cooled using heat exchangers, cooling towers, aspirators, spargers, or other suitable procedures, either singularly or together, and may be done in such a way as to conserve energy. The temperature to which the solution is cooled lies in the range 30° to 80° C. The stability of dissolved ferric iron increases with decreasing temperature; therefore, it is preferable to cool to a low temperature, to avoid substantial precipitation of dissolved ferric iron as a jarosite due to premature hydrolysis in either step (1) or step (2). The extent to which premature hydrolysis can be tolerated depends upon subsequent treatment of solids from step (2).

Preneutralization in step (2) can be conducted in one or more stages using various suitable neutralizing agents. For integration with the electrolytic zinc process, the applicants have found that thickener underflow from the neutral leach step or calcine are the most suitable neutralizing agents and may be used separately or together. The present invention is not limited, however, to this particular combination or choice of neutralizing agents.

Depending on the neutralizing agent used, it may be necessary to separate residues or undissolved neutralizing agent before proceeding to step (3).

In step (3) of the process, dissolved ferric iron is substantially precipitated as a jarosite by heating the clarified solution derived from step (2) in the presence of sodium, potassium or ammonium ions to a temperature up to the boiling point of the solution at atmospheric pressure. Temperatures lying in the range 80° C. to the boiling point of the solution at atmospheric pressure are suitable, preferably those above 95° C. The method of heating can be by live steam injection, submerged combustion, indirect heating using suitable heat exchangers, or other methods, either singularly or in combination, known to those skilled in the art.

The extent of ferric iron precipitation and the concentration of dissolved ferric iron in solution leaving step (3) will depend on several factors. Some of these are related and the optimum conditions chosen will depend on how the process of the present invention can be best integrated with a new or existing electrolytic zinc plant circuit.

For maximum precipitation of dissolved ferric iron, it is preferable to operate at a high temperature, a long residence time, low initial ferric iron and free acid concentrations, a high concentration of suitable seed material, and a high concentration of sodium, potassium, and ammonium ions. Concentrations of the said ions totalling in excess of 0.8 times stoichiometric to form jarosite are preferred. The aforesaid ions may be added as a soluble basic compound at the beginning of or during step (3), so that the said basic compound will then neutralize a portion of the free acid in the solution in step (3), thereby allowing more complete precipitation of the ferric iron. The residence time should preferably lie in the range 5 to 24 hours.

The initial ferric iron concentration in solution entering step (3) should preferably lie in the range 15 to 25 grams per liter and the initial free acid concentration in the range 2 to 15 grams per liter.

In step (4) of the process, the jarosite is separated from the solution by solids-liquid separation procedures, and washed to remove most of the entrained dissolved non-ferrous metals. Various liquid-solid separation and washing procedures are well known to those skilled in the art.

The solution from step (4) may be sent to the neutral leach step of the electrolytic zinc process or alternatively it may be treated using known procedures in a separate iron removal step, in which a neutralizing agent is added, any ferrous iron oxidised to ferric iron, and a major part or all the ferric iron precipitated to produce a solution low in iron which is then returned to the electrolytic zinc process. The solids from the separate iron removal step may be recycled as a neutralizing agent to step (2) of the process. Alternatively, they may be recycled to the neutral leach step or dilute acid leach step of the electrolytic zinc process. Alternatively, all of the thickener underflow pulp or filter cake from the separate iron removal step can be recycled to the hot acid leach step and calcine or other suitable neutralizing agent added to the preneutralization step.

Figure 3:
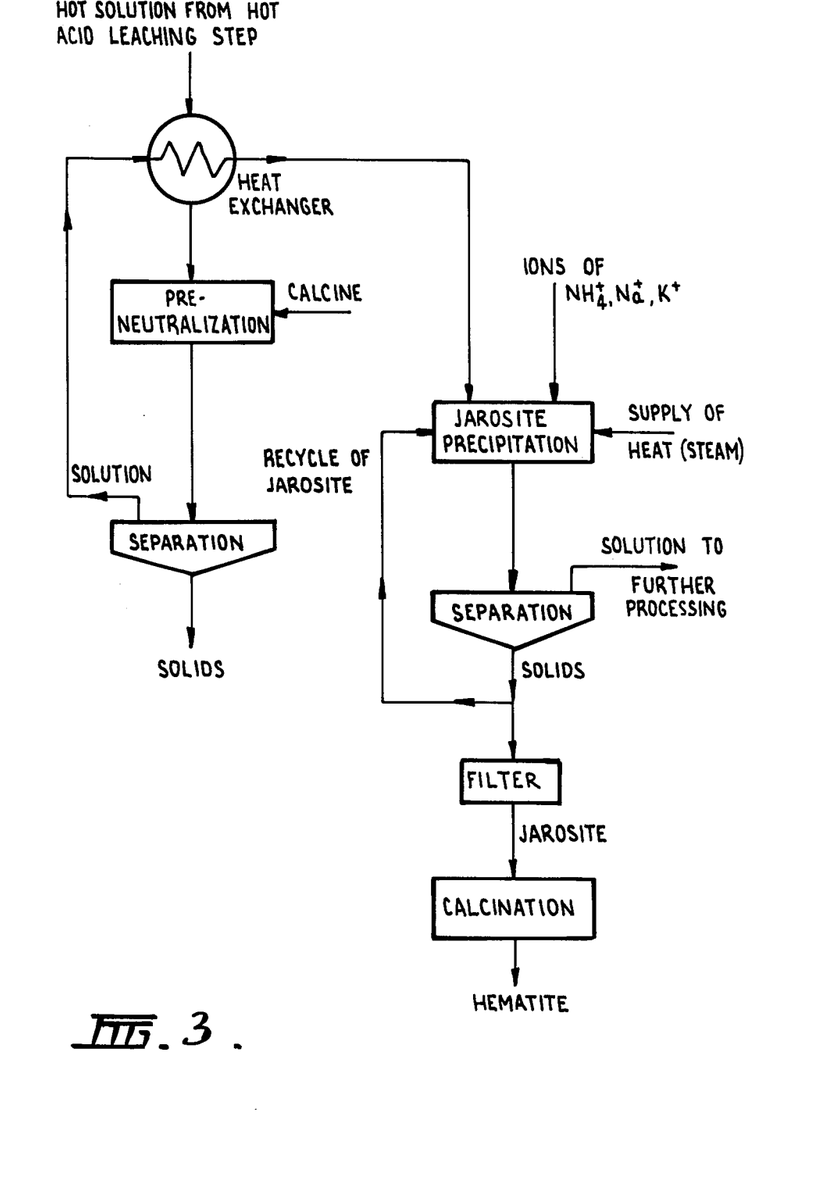
FIG. 3 is a flow sheet of a typical embodiment of the process of the present invention.

FIG. 3 shows a typical non-limiting example of this preferred form of the present invention applied to the removal of iron from a sulphate solution containing ferric iron derived from the leaching of zinc oxide calcine. In order to conserve energy, a heat exchanger is used for cooling the solution in step 1.

Figure 4:
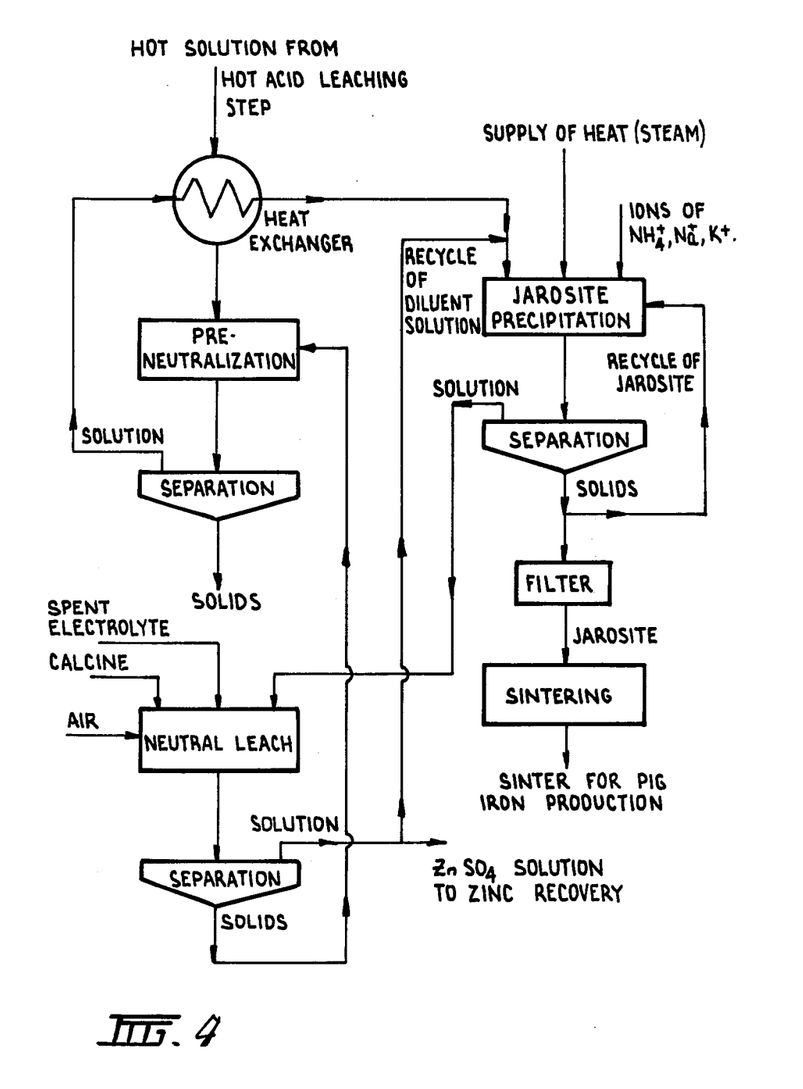
FIG. 4 is a flow sheet of a typical embodiment of the process of the present invention with recycle of neutral solution in the jarosite precipitation step.

Under certain circumstances it is advantageous to dilute the solution by recycling a portion of the overflow solution from the jarosite thickener back to the preneutralization step, in order to lower the ferric iron concentration in the preneutralization step. It may also be advantageous to recycle a portion of the overflow from the neutral leach thickener to the preneutralization or jarosite precipitation steps, in order to dilute the solutions in the said steps. The optimum combination and the extent of dilution desirable will depend upon many factors and can be best evaluated in plant trials. All such operating modes with recycle fall within the scope of the present invention, and the previously designated range of acidity of 0.1 to 25 grams per liter includes the effect of any such dilution. Dilution in the preneutralization step is advantageous as it lowers the ferric iron concentration, thereby reducing the possibility of substantial premature hydrolysis. Dilution in or immediately before the jarosite precipitation step is also advantageous as it reduces the acidity irrespective of whether the acid was present initially or formed as a result of the jarosite precipitation reaction. FIG. 4 shows a typical non limiting example of the present invention with a recycle of neutral solution as a diluent in the jarosite precipitation step.

Alternatively, it may be advantageous to recycle a solution which is produced by partially neutralizing the free acid in all or portion of the thickener overflow solution from the jarosite precipitation step such that the acidity is reduced to within the range of 0.1 to 30, preferably 0.1 to 10, grams per liter, without substantial precipitation of the remaining dissolved ferric iron in the solution. This partial neutralization procedure is hereinafter termed the post-neutralization step. For the best results this post-neutralized solution should be recycled to the jarosite precipitation step.

We have also found that under certain circumstances, for example if the acidity of solution from the hot acid leach step is already at a suitably low level, satisfactory precipitation of iron as a jarosite can be achieved by adequately diluting the solution from the hot acid leach step followed by heating the diluted solution to a temperature up to the boiling point at atmospheric pressure in the presence of sodium, potassium or ammonium ions, or mixtures of these ions and in the presence of recycled jarosite, thereby making steps (1) and (2) of the previously described process unnecessary.

According to a further form of the present invention there is provided a process for precipitating ferric iron as a jarosite from a sulphate solution containing ferric iron, free acid, and valuable non-ferrous metals characterised by diluting the said solution with a diluent solution of low acidity so that the ferric iron concentration of the diluted solution lies in the range 5 to 35 grams per liter and the free acid concentration lies in the range 5 to 40 grams per liter, heating to a temperature up to the boiling point at atmospheric pressure in the presence of at least one ion chosen from the group consisting of sodium, potassium and ammonium ions, in the presence of recycled jarosite, without the addition of any neutralizing agent so that substantially all of the ferric iron is precipitated as a jarosite, followed by separation of the jarosite from the solution which is further processed by established procedures for the recovery of dissolved valuable nonferrous metals, thereby producing a jarosite contaminated with only minor amounts of non-ferrous metals.

Figure 5:
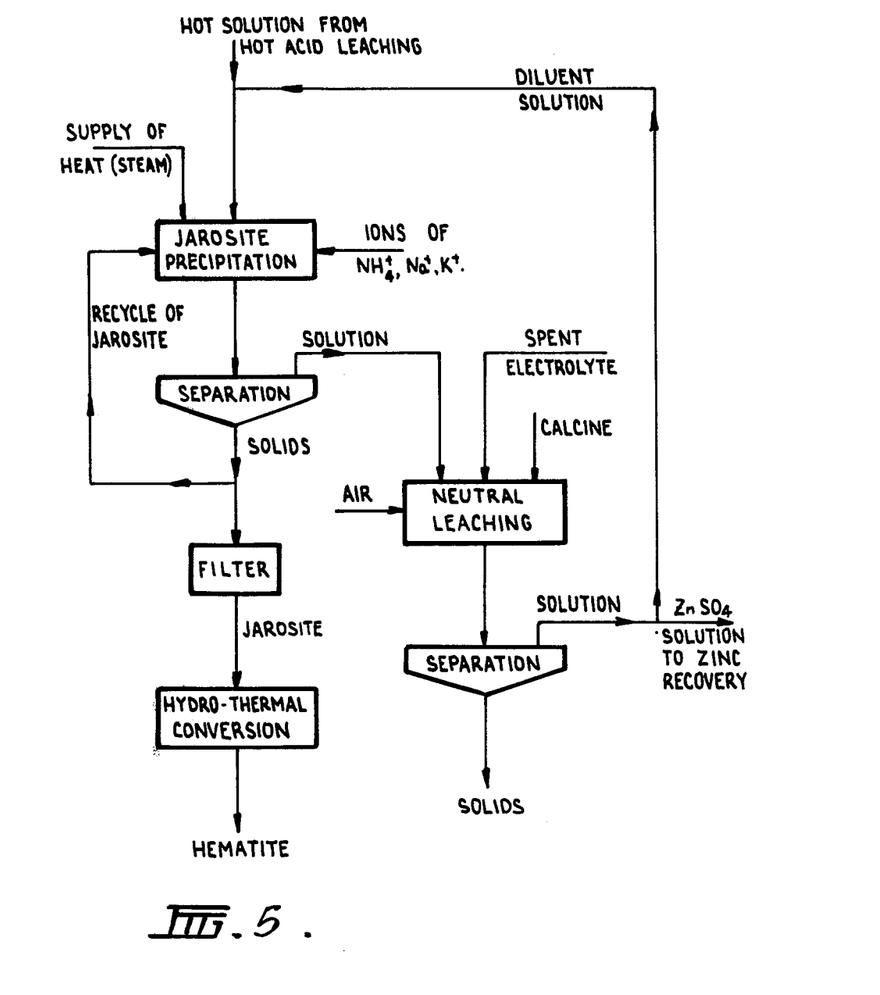
FIG. 5 is a typical flowsheet of a preferred form of the process of the present invention.

According to another preferred form of the present invention, there is provided a process for precipitating ferric iron from a sulphate solution in which the sulphate solution originates from a hot acid leaching step in the electrolytic zinc process and which after separation of undissolved solids contains 5 to 50, preferably 15 to 25, grams of ferric iron per liter, 30 to 100, preferably 30 to 50, grams of free sulphuric acid per liter, and at least 20 grams of zinc per liter as well as non-ferrous metal impurities including cadmium, copper and nickel, characterised by diluting the said solution with a diluent solution containing 0 to 15 grams of ferric iron per liter, 0 to 30, preferably 0 to 10, grams of free sulphuric acid per liter, and at least 20 grams of zinc per liter, the ratio of the diluent solution to the said solution being such as to form a diluted solution containing 5 to 35, preferably 5 to 20, grams of ferric iron per liter, 5 to 40, preferably 5 to 20, grams of free sulphuric acid per liter, and at least 20 grams of zinc per liter, heating said diluted solution to a temperature in the range 80° C. to the boiling point of the solution at atmospheric pressure, preferably above 95° C., in the presence of at least one ion chosen from the group consisting of sodium, potassium, and ammonium ions, the mole ratio of said ions to dissolved ferric iron lying in the range 0.1 to 10, in the presence of recycled jarosite, preferably in the range 50 to 400 grams of jarosite per liter of diluted solution, and without addition of any neutralizing agent, other than any which may be added as a source of the aforesaid ions, so that substantially all of the ferric iron is precipitated as a jarosite, separating the jarosite from the solution by thickening, filtration and washing, thereby producing a solution which is further processed by established procedures for the recovery of dissolved valuable non-ferrous metals and jarosite contaminated with only minor amounts of nonferrous metals. FIG. 5 shows a typical non-limiting example of this preferred form of the process according to the present invention.

It is also advantageous if at least a portion of the solution from the jarosite precipitation step after separation of the jarosite is admixed in a controlled manner with a neutralizing agent, preferably zinc oxide calcine, to produce a solution containing 0 to 30, preferably 0 to 10, grams of sulphuric acid per liter and after separation of any residue from the neutralizing atent, at least a portion of the solution so produced is used as the diluent solution.

Any remaining solution from the jarosite precipitation step not so treated passes advantageously to further processing in the electrolytic zinc process as does any remainder of the treated solution not recycled as a diluent.

The post-neutralization step may be performed without cooling the solution, and we have found that a short residence time is preferable to avoid substantial precipitation of the remaining iron as jarosite. Suitable neutralizing agents would include thickener underflow from the neutral leaching step, calcine, limestone or lime, and these may be used individually or in combination. Depending upon the neutralizing agent used, it may be desirable to separate residues or undissolved neutralizing agent before the solution is recycled. The post-neutralization step may be performed on part or all of the jarosite thickener overflow solution, with any excess over that needed for recycle passing on to further processing.

Such further processing could be a neutral leaching step performed in a manner well known to those skilled in the art or a second stage of jarosite precipitation, performed under similar conditions with respect to temperature, the presence of ions from a group containing sodium, potassium and ammonium and in the presence of recycled jarosite seed as used in the jarosite precipitation step of the present invention.

It will be apparent to those skilled in the art that the dilution need not occur before the start of the jarosite precipitation step, but that the two solutions (sulphate solution and diluent solution) could enter the jarosite precipitation step separately in the proportions necessary to produce a diluted solution with the desired composition, so that dilution and jarosite precipitation occur within the same step.

It will also be clear that at least one of the two solutions making up the diluted solution may be heated prior to dilution so that the temperature of the diluted solution is at or above the desired temperature for jarosite precipitation, thereby obviating the need to heat the diluted solution to the desired temperature.

Figure 6:
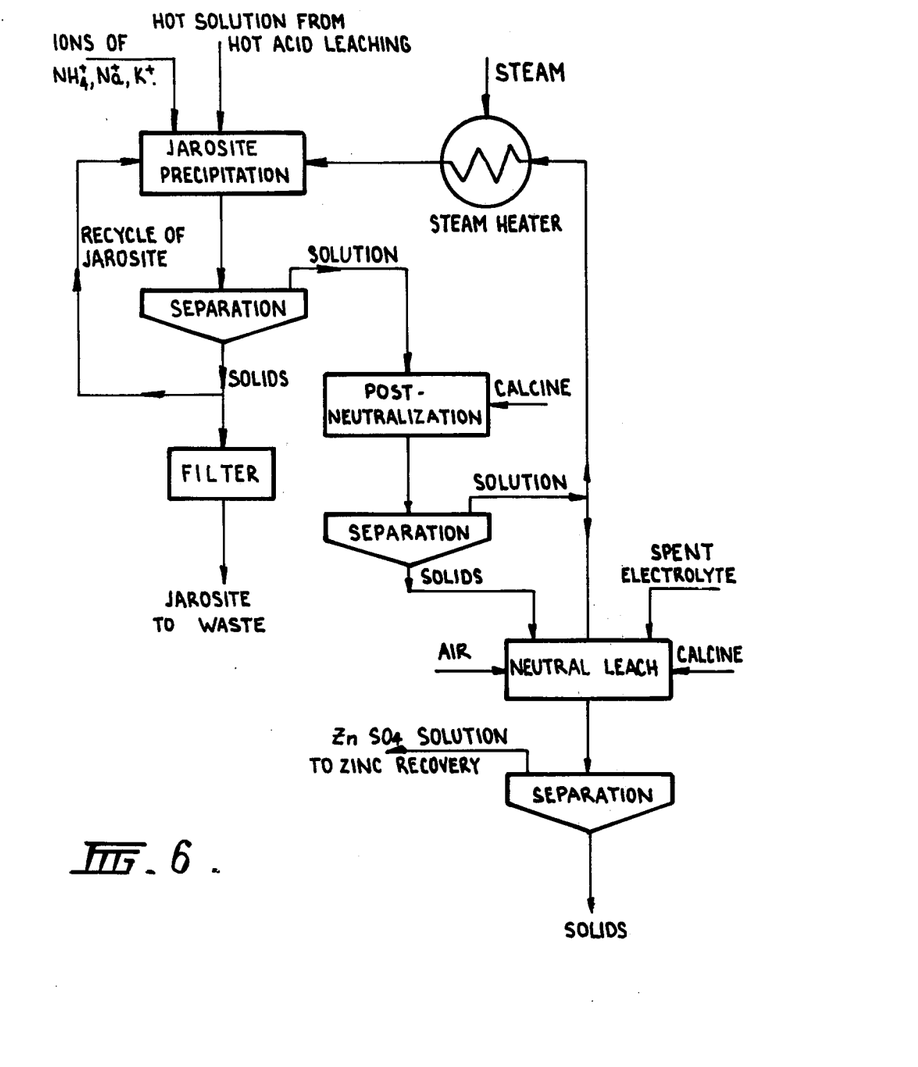
FIG. 6 is a typical flowsheet of a preferred form of the process of the invention with partial neutralization, dilution and precipitation of jarosite in a single step.

FIG. 6 illustrates a non-limiting example of this preferred form of the process according to the present invention.

One of the advantages of the present invention over the prior art is that the precipitation of jarosite is self regulating and no complex pH control system is required to regulate the addition of a neutralizing agent during precipitation of the jarosite. The precipitated jarosite possesses uniform settling and filtration properties all of which lead to a process which is simple to operate, and produces jarosite with uniform physical and chemical properties.

The jarosite produced by the process of this invention is contaminated with only small amounts of nonferrous metals and therefore it can be disposed of as a waste product with fewer environmental problems. Similarly, it is a more suitable raw material for other manufacturing processes such as the production of pig iron or pigments.

For the production of pig iron the jarosite produced according to the present invention can be sintered or pelletised at elevated temperatures to decompose the jarosite, simultaneously producing an agglomerated iron oxide. Since many non-ferrous metals volatilize during sintering or pelletizing at elevated temperatures, the non-ferrous metal content of the product from the sintering of pelletizing process will be lower than that expected based upon the non-ferrous metal content of the jarosite fed to the sintering or pelletizing process. Furthermore, from the prior art there are known techniques, chloridisation, for example, which induce additional volatilisation of many of the non-ferrous metals during sintering or pelletizing; these techniques can therefore be used to produce an agglomerated iron oxide of even higher purity if desired.

An example of operation of the process of the present invention with sintering of the jarosite product to form an agglomerated iron oxide is given in Example 5.

For the production of pigment grade ferric oxide, the jarosite produced by operation of the present invention can, for example, be calcined according to the procedure disclosed in Australian patent application No. 87973/75. Because the jarosite produced by the process of the present invention is contaminated with smaller amounts of non-ferrous metals than jarosites currently produced in commercial electrolytic zinc plants, it is obvious that the ferric oxide produced by calcination of such jarosites will be less contaminated than that currently produced by the calcination of commercially produced jarosite. If the jarosite before calcination contains sodium or potassium, it may be desirable to subject the ferric oxide to a suitable washing procedure to remove any soluble salts including those of sodium and potassium which may be present. The solution containing such soluble salts may, if desired, be returned to the jarosite precipitation step.

It is also possible to subject the jarosite product to a hydrothermal conversion to ferric oxide by heating the jarosite with water (or dilute sulphuric acid) in an autoclave at a temperature in the range 140° to 260° C. Under these conditions the jarosite is converted into finely divided, high purity ferric oxide eminently suitable for use as a pigment. The advantage of this procedure is that during the autoclave treatment, sulphuric acid and the cations $Na^+$, $K^+$, or $NH_4^+$ originally combined in the jarosite precipitate are liberated and report in the solution which can be separated from the ferric oxide by standard procedures after discharge from the autoclave. This solution, can with advantage be recycled, preferably back to the preneutralization stage of the electrolytic zinc plant circuit. Here excess acidity is neutralised and the cations are available for precipitation of more jarosite.

An example illustrating the hydrothermal conversion of jarosite into high purity ferric oxide is given in Example 6.

It will be obvious to those skilled in the art that both the rate and the extent of jarosite precipitation in the process of the present invention can be further increased by the deliberate addition of neutralizing agents to the jarosite precipitation step. The amount of neutralizing agent required to achieve the same extent of iron precipitation would be much less than would be required in operation of the jarosite process according to the prior art. The addition of neutralizing agents to increase the precipitation of jarosite in conjunction with operation of the present process falls within the scope of the present invention.

Neutralizing agents which could be used would depend upon whether the jarosite is to be reprocessed or disposed of as a waste product. To be suitable for reprocessing the jarosite should have a very low nonferrous metal content, and neutralizing agents which leave no residue, including such neutralizing agents as zinc oxide, basic zinc sulphate, zinc carbonate, ferric oxide and ferric hydroxide, could be used.

If the jarosite is to be disposed of as a waste material, small amounts of neutralizing agents such as limestone or lime which contain no environmentally-harmful non-ferrous metals may be suitable. The addition of small amounts of neutralizing agents such as calcine which leave a residue containing toxic non-ferrous metals could be made in conjunction with the process of this invention, and the jarosite so produced would be less contaminated with non-ferrous metals than the jarosite produced according to the prior art.

To illustrate the operation of the present invention the following examples are quoted:

EXAMPLE 1

Typical high acid leach solution containing
Zn—78 g/l
$Fe^{+++}$—15.2 g/l
$H_2SO_4$—55 g/l
$NH_4^+$—3.2 g/l
was cooled to 50° C. and neutralized with calcine. Following separation of undissolved solids the solution analysis was as follows:
Zn—109 g/l
$Fe^{3+}$—14.8 g/l
$H_2SO_4$—4.8 g/l This solution was then maintained at 50° C. for 20 hours and no iron was precipitated.

At the end of this period the solution was heated to 100° C. and maintained at this temperature for 6 hours. Ammonium hydroxide was added to maintain the ammonium concentration approximately constant. Jarosite solids were precipitated and after separation and washing, the mother liquor and dried washed solids were analysed as follows:

| Solution | $Fe^{3+}$ | 4.0 g/l |
|---|---|---|
| | $H_2SO_4$ | 22.2 g/l |
| | $NH_4^+$ | 3.3 g/l |
| Solids | Iron | 32.4% |
| | Zinc | 0.46% |
| Water Soluble | Zinc | 0.0045% |
| | Lead | 0.035% |
| | $NH_4$ | 2.8% |
| | Cu | 0.016% |
| | Cd | 0.001% |
| | Ca | 0.05% |
| | Mg | less than 0.01% |
| | $SiO_2$ | less than 0.01% |
| | Hg | 0.23 ppm |
| | Ag | 4 ppm |

It will be apparent to those skilled in the art that the precipitated jarosite is of much higher purity than that normally produced. (See the typical analysis given on page 6).

EXAMPLE 2

A high acid leach solution after preneutralization and addition of ammonium hydroxide was analysed and found to contain
$Fe^{+++}=25.8$ g/l $H_2SO_4 = 12.9$ g/l
$NH_4^+ = 5$ g/l This solution was divided into 6 portions, and treated in the following manner:

Portion 1—Maintained with agitation at 100° C. without seed

Portion 2—Maintained with agitation at 100° C. with 50 g/l of jarosite seed

Portion 3—Maintained with agitation at 100° C. with 100 g/l of jarosite seed

Portion 4—Maintained with agitation at 100° C. with 200 g/l of jarosite seed

Portion 5—Maintained with agitation at 100° C. with 300 g/l of jarosite seed

Portion 6—Diluted with an equal volume of neutral $ZnSO_4$ solution and maintained with agitation at 100° C. with 150 g/l of jarosite seed Samples were taken at regular intervals, filtered, and the ferric iron concentration in the filtrate samples determined with the following results.

| Portions | 1 | 2 | 3 | 4 | 5 | 6 | |
|---|---|---|---|---|---|---|---|
| | | | | | | Diluted + 150 g/l seed | |
| Time (hrs) | No seed $Fe^{+++}$ conc. g/l | 50 g/l seed $Fe^{+++}$ conc. g/l | 100 g/l seed $Fe^{+++}$ conc. g/l | 200 g/l seed $Fe^{+++}$ conc. g/l | 300 g/l seed $Fe^{+++}$ conc. g/l | $Fe^{+++}$ conc. g/l of diluted solution | $Fe^{+++}$ conc. g/l of original solution |
| ½ | 25.7 | 18.7 | 18.5 | 17.5 | 15.0 | 5.5 | 11.0 |
| 1 | 24.9 | 17.7 | 16.6 | 15.5 | 12.7 | 4.3 | 8.6 |
| 2 | 24.0 | 16.3 | 14.2 | 12.9 | 11.7 | 3.8 | 7.6 |
| 3 | 23.0 | 15.2 | 12.7 | 11.9 | 11.0 | 3.5 | 7.0 |
| 4 | 22.2 | 14.5 | 12.0 | 11.2 | 10.4 | N.D. | N.D |
| 5 | 21.2 | 13.4 | 11.5 | 10.5 | 9.7 | N.D. | N.D. |
| 6 | 20.1 | 12.9 | 11.1 | 10.0 | 9.3 | N.D. | N.D. |

N.D. = Not determined.

It can be seen that both dilution and the addition of jarosite seed lead to enhanced rates of precipitation of ferric iron.

EXAMPLE 3

A typical high acid leach solution, similar in composition to that used in Example 1, was cooled to 50° C. and excess acid neutralized with calcine. Following separation of undissolved solids the solution analysis was as follows:

Zn—97 g/l
$Fe^{3+}$—16.4 g/l
$H_2SO_4$—4.5 g/l
$NH_4^+$—2.9 g/l

This solution was then pumped continuously at a rate of 2 liter/hour into the first of a series of four steam-heated, stainless steel reaction vessels, each of which was fitted with baffles and a mechanical agitator. The pulp overflowed from each vessel into the next in series. The volume of each vessel was 6.0 liters, and the temperature of each vessel was maintained at 100° C. by injection of steam into the jackets of the vessels. Injection of steam was automatically controlled by use of thermistors suspended in the pulp in the vessels. Ammonium hydroxide and water were added to maintain the ammonium concentration approximately constant and to compensate for evaporation losses.

After the process had been operating for 12 hours, and steady state conditions had been established, samples of pulp were collected from each vessel, filtered, and the filtrates analysed. The following results were obtained.

| Vessel No. | $Fe^{3+}$ g/l | $H_2SO_4$ g/l | $NH_4^+$ g/l |
|---|---|---|---|
| 1 | 11.5 | 9.1 | — |
| 2 | 10.5 | 13.1 | — |
| 3 | 9.1 | 15.3 | — |
| 4 | 7.4 | 17.9 | 3.2 |

The test described above was repeated in a second experiment in which jarosite produced in the first test was recycled continuously back to the first reaction vessel at a rate equivalent to 100 g of jarosite per liter of feed solution.

After the experiment had been operating for 12 hours and steady state conditions had been established samples of pulp were collected from each vessel, filtered, and the filtrates analysed. The following results were obtained.

| Vessel No. | $Fe^{3+}$ g/l | $H_2SO_4$ g/l | $NH_4^+$ g/l |
|---|---|---|---|
| 1 | 6.1 | 16.8 | — |
| 2 | 4.7 | 17.6 | — |
| 3 | 4.0 | 18.4 | — |
| 4 | 3.5 | 18.9 | 3.4 |

The test described above was repeated in a third experiment in which jarosite solids were recycled continuously back to the first vessel at a rate of 150 g of jarosite per liter of feed solution. In all other respects the experiment was identical to the earlier ones.

After the experiment has been operating for 12 hours and steady state conditions had been established, samples of pulp were collected from each vessel, filtered and the filtrates analysed. The following results were obtained.

| Vessel No. | $Fe^{3+}$ g/l | $H_2SO_4$ g/l | $NH_4^+$ g/l |
|---|---|---|---|
| 1 | 6.2 | 16.6 | — |
| 2 | 4.5 | 18.6 | — |
| 3 | 3.9 | 20.7 | — |
| 4 | 3.2 | 21.0 | 3.5 |

These three experiments illustrate the beneficial effect that recycling of jarosite seed has on reducing the final ferric iron concentration.

EXAMPLE 4

A solution containing $Fe^{+++} = 6.6$ g/l
$H_2SO_4 = 32.7$ g/l
$NH_4^+ = 3$ g/l was reacted with zinc oxide calcine at 90° C. The residue was separated off and the resulting solution was analysed and found to contain $Fe^{+++} = 6.5$ g/l
$H_2SO_4 = 3.8$ g/l 500 ml of this solution was then mixed with 500 ml of typical solution from the hot acid leaching step of a zinc plant, containing $Fe^{+++} = 21.1$ g/l
$H_2SO_4 = 40.4$ g/l $NH_4OH$ solution was then added to the combined solutions to make up for the ammonia which would be removed in jarosite precipitation. The resulting solution contained $Fe^{+++} = 13.8$ g/l
$H_2SO_4 = 20.1$ g/l
$NH_4^+ = 4$ g/l This solution was heated to 100° C. and 120 grams of jarosite was added as seed. After 5 hours the solution was separated from the jarosite, analysed and found to contain $Fe^{+++} = 7.05$ g/l
$H_2SO_4 = 31.75$ g/l This solution was then reacted with calcine at 90° C., the residue separated off and the solution analysed and found to contain $Fe^{+++} = 7.05$ g/l
$H_2SO_4 = 5.8$ g/l This solution was heated to 100° C., and seed jarosite was added at the rate of 120 g/l to precipitate iron as jarosite in a second stage. After 3 hours the solution was separated from the jarosite, analysed, and found to contain $Fe^{+++} = 2.0$ g/l
$H_2SO_4 = 14.3$ g/l Thus the ferric iron content of the original solution was reduced from 20 g/l to 2.0 g/l; a 90% overall removal of dissolved ferric iron.

EXAMPLE 5

Typical high acid leach solution similar in composition to that used in Example 1 was cooled to 55° C. and excess free acidity neutralized with calcine. Following separation of the undissolved solids the solution was stored in a 15 m³ holding tank.

Analysis of the solution was as follows;
Zn—97.6 g/l
$H_2SO_4$—6.3 g/l
$Fe^{3+}$—18.0 g/l
$NH_4^+$—3.3 g/l This solution was then pumped continuously at a rate of 1.7 liter/minute into the first of three baffled, mechanically agitated, lead lined, wood stave reaction vessels arranged in series so that pulp overflowed from each vessel into the next in series. The volume of each vessel was 200 liters. Stainless steel steam coils immersed in each tank were used to maintain a temperature of 100° C. in each vessel. Ammonium hydroxide and water were added to the three vessels to maintain the ammonium ion concentration approximately constant and to compensate for evaporation losses.

Overflow from the third vessel was collected in a small scale thickener from which settled jarosite solids were removed, subjected to a two stage decantation wash with water, filtered and stockpiled.

This experiment was operated 24 hours a day for four days, at the end of which period, a stockpile of several kilograms of jarosite had been accumulated.

Typical analyses of the jarosite produced and of solution leaving the last reaction vessel are listed below.

| Solution | Zn | 97.2 g/l |
|---|---|---|
| | $H_2SO_4$ | 21.8 g/l |
| | $Fe^{3+}$ | 7.6 g/l |
| | $NH_4^+$ | 3.4 g/l |
| Jarosite Solids: | Total Zn | 0.75% |
| | Water Soluble Zn | 0.49% |
| | CaO | 0.34% |
| | MgO | 0.04% |
| | $Al_2O_3$ | 0.008% |
| | $SiO_2$ | 0.25% |
| | Fe | 31.9% |
| | $SO_4$ | 40.35% |
| | $NH_4$ | 2.5% |
| | Pb | 0.21% |
| | Cd | 0.002% |
| | As | 0.14% |
| | Cu | 0.007% |
| | Cl | 0.0015% |
| | Mn | 0.05% |
| | Co | <0.01% |
| | Ni | <0.01% |
| | Hg | 0.46 ppm |

The jarosite produced in this run, and containing 8.3% moisture, was then subjected to a series of pot sintering tests, using either a 0.04 m² or a 0.1 m² surface area suction pot. The jarosite was premixed with limestone, coke and return fines derived from preliminary tests, and ignited by means of charcoal in the small pot and by an oil fired ignition hood in the larger pot. In all tests the sinter was allowed to cool in the pot and then dropped five times from a 2 m height onto a steel plate and different screen fractions collected. The +6 mm screen fraction, less the hearth layer quantity, was taken to be the sinter product, while the −6 mm screen fraction was used as recycled fines in later runs.

A typical result obtained using a 300% of recycled fines, 36% of coke, 8% of limestone and a bed height of 30 cms was the production of a fine grained, hard, non dusting, granular sinter at a rate equivalent to a specific sinter output of 7.2 tonnes of sinter per m² of grate area per 24 hours.

A typical analysis of the sinter was as follows.
Fe—58–59%
Total S—0.14–0.23%
Ni—0.0045%
Zn—1.0–1.4%
Pb—0.05–0.08%
As—0.03–0.05%
Sb—0.01%

The analysis indicates that such a sinter could be blended with high grade ore for the production of pig iron.

EXAMPLE 6

In yet another variant of the process of the present invention, a sample of jarosite produced in a batch experiment identical to that described in Example 1 was heated with water in a stainless steel autoclave for 4 hours at 235° C. After discharge from the autoclave the finely divided ferric oxide product was separated from the solution by filtration, washed, dried and analysed. Analyses of the original jarosite and of the ferric oxide product are given below, together with the analysis of a typical pigment ferric oxide produced from jarosite.

| Element | Percentage Composition | | | |
|---|---|---|---|---|
| | Fe | Total Zn | Pb | Cu |
| Jarosite | 32.5 | 0.24 | 0.04 | <0.01 |
| Ferric Oxide | 64.0 | 0.02 | 0.12 | 0.002 |
| Pigment Fe$_2$O$_3$ | 60.0 | 0.5 | >0.5 | 0.1 |

The average particle size of the ferric oxide was 0.2 micrometers, which, together with the low level of impurities, makes this material eminently suitable as a pigment.

We claim:

1. A process for precipitating iron as a jarosite from a sulphate solution containing ferric iron, free acid, and valuable non ferrous metals, characterised by treating the said solution in a stepwise process comprising:
   (1) adjusting the composition of the solution so that the concentration of sulphuric acid lies in the range 0.1 to 40 grams per liter, and the ferric iron concentration lies in the range 5 to 35 grams per liter by
      (a) cooling the solution to a temperature in the range 30° to 80° C. and sufficient to avoid substantial precipitation of dissolved ferric iron as a jarosite due to premature hydrolysis, partially neutralizing the free acid and then clarifying the solution, or by (a) and
      (b) diluting the solution with an aqueous diluent containing 0 to 30 grams of sulphuric acid per liter
   (2) heating the clarified solution so adjusted in one or more stages to a temperature in the range 80° C. to the boiling point of the solution at atmospheric pressure, in the presence of at least one ion chosen from the group consisting of sodium, potassium and ammonium ions, the mole ratio of the said ions to dissolved ferric iron lying in the range 0.1 to 10, and in the presence of recycled jarosite, and without addition of any further neutralizing agent other than any which may be added as a source of the aforesaid ions, so that substantially all of the ferric iron is precipitated as a jarosite. and
   (3) separating the jarosite precipitated in step (2) from the solution by thickening, filtration and washing;
   thereby producing a jarosite contaminated with only minor amounts of non-ferrous metals, and a solution containing dissolved valuable non-ferrous metals.

2. A process according to claim 1, in which the sulphate solution is a solution containing 5 to 50 grams of ferric iron per liter, 30 to 100 grams of free sulphuric acid per liter, and at least 20 grams of zinc per liter as well as non-ferrous metal impurities including cadmium, copper, and nickel.

3. A process according to claim 1, in which the sulphate solution contains 15 to 25 grams of ferric iron per liter, and 35 to 70 grams of free sulphuric acid per liter.

4. A process according to claim 1, characterised by treating the said sulphate solution in a stepwise process comprising:
   (1) cooling the said solution to a temperature in the range of 30° to 80° C., treating the cooled solution in one or more stages with a neutralizing agent or agents to lower the free acidity of the solution to within the range 0.1 to 25 grams per liter, and separating any residues or undissolved neutralizing agents from the solution;
   (2) heating the clarified solution from step (1) in one or more stages to a temperature in the range 80° C. to the boiling point of the solution at atmospheric pressure, in the presence of at least one ion chosen from the group consisting of sodium, potassium, and ammonium ions, the mole ratio of the said ions to dissolved ferric iron lying in the range 0.1 to 10, and in the presence of recycled jarosite, and without addition of any further neutralizing agent other than any which may be added as a source of the aforesaid ions, so that substantially all of the ferric iron is precipitated as a jarosite; and
   (3) separating the jarosite precipitated in step (2) from the solution by thickening, filtration and washing;
   thereby producing a jarosite contaminated with only minor amounts of non-ferrous metals, and a solution containing dissolved valuable non-ferrous metals.

5. A process according to claim 4, in which in step (1), the solution is cooled and the free acidity of the solution is lowered to within the range 2 to 15 grams per liter; in step (2) the clarified solution is heated to a temperature above 95° C., and the concentration of recycled jarosite is in the range 50 to 400 grams per liter of solution.

6. A process substantially according to claim 1, in which step (1) consists of cooling the solution, lowering the free acidity by the addition of a neutralizing agent followed by clarification, and diluting the clarified solution with an aqueous diluent containing zinc sulphate and between 0 and 30 grams of sulphuric acid per liter so forming a diluted solution containing between 0.1 and 25 grams of sulphuric acid per liter.

7. A process according to claim 6, in which the aqueous diluent contains 0 to 10 grams of sulphuric acid per liter, 0 to 15 grams of ferric iron per liter, and at least 20 grams of zinc sulphate per liter; the diluted solution contains 5 to 20 grams of sulphuric acid per liter, 5 to 20 grams of ferric iron per liter, and at least 20 grams of zinc per liter; in step (2) the diluted solution is heated to a temperature above 95° C., and the concentration of recycled jarosite is in the range 50 to 400 grams per liter of solution.

8. A process according to claim 6, in which at least a portion of the solution from the jarosite precipitation step, after separation of the jarosite, is admixed in a controlled manner with a neutralizing agent, to produce a solution containing 0 to 30 grams of sulphuric acid per liter and after separation of residue from the neutralizing agent, at least a portion of the solution so produced is used as the said aqueous diluent.

9. A process according to claim 6, in which at least a portion of the solution from the jarosite precipitation step after separation of the jarosite is admixed in a controlled manner with zinc oxide calcine, to produce a solution containing 0 to 10 grams of sulphuric acid per liter and after separation of residue from the neutralizing agent, at least a portion of the solution so produced is used as the said aqueous diluent.

10. A process according to claim 6, in which the said aqueous diluent is added directly to the jarosite precipitation step so that dilution and jarosite precipitation occur within the same step.

11. A process according to claim 6, in which at least one of the two solutions making up the said diluted solution is heated before dilution to a temperature such that the temperature of the combined solutions is at least the temperature required in the jarosite precipitation step.

12. A process according to claim 1, in which a portion of the solution from the jarosite precipitation step, after separation of the jarosite is recycled back to step (1).

13. A process according to claim 1, in which a solution containing dissolved valuable non-ferrous metals and a low free acid concentration is recycled to step (1).

14. A process according to claim 1 wherein the jarosite produced is converted by calcination into high grade ferric oxide suitable for use as a pigment, followed by washing to remove water soluble salts.

15. A process according to claim 1 wherein the jarosite produced and is subjected to hydrothermal conversion by heating the jarosite in an autoclave to a temperature in the range 140°–260° C., followed by separation of the solid and solution products.

* * * * *